United States Patent
Soulié et al.

(10) Patent No.: US 12,049,298 B2
(45) Date of Patent: Jul. 30, 2024

(54) CONTROL LEVER ASSEMBLY FOR CONTROLLING AN AIRCRAFT SYSTEM

(71) Applicant: Ratier-Figeac SAS, Figeac (FR)

(72) Inventors: Arnaud Soulié, Figeac (FR); Patrick Moulènes, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 0 days.

(21) Appl. No.: 17/943,572

(22) Filed: Sep. 13, 2022

(65) Prior Publication Data

US 2023/0081520 A1 Mar. 16, 2023

(30) Foreign Application Priority Data

Sep. 13, 2021 (EP) .................................. 21306248

(51) Int. Cl.
*G05G 9/047* (2006.01)
*B64C 13/04* (2006.01)
*G05G 1/04* (2006.01)

(52) U.S. Cl.
CPC ........... *B64C 13/0421* (2018.01); *G05G 1/04* (2013.01); *G05G 9/047* (2013.01)

(58) Field of Classification Search
CPC ...... B64C 13/0421; G05G 1/04; G05G 9/047; G05G 25/04
See application file for complete search history.

(56) References Cited

U.S. PATENT DOCUMENTS

| | | | |
|---|---|---|---|
| 3,971,564 A | 7/1976 | Bowen et al. | |
| 6,429,849 B1 * | 8/2002 | An ........................ | G05G 25/04 |
| | | | 345/161 |
| 10,353,423 B2 * | 7/2019 | Miyachi ................. | F16H 59/02 |
| 2005/0056112 A1 | 3/2005 | Mandou | |
| 2020/0393865 A1 | 12/2020 | Parazynski et al. | |
| 2021/0276418 A1 | 9/2021 | Eul et al. | |

FOREIGN PATENT DOCUMENTS

| | | | | |
|---|---|---|---|---|
| FR | 2851811 A1 * | 9/2004 | ......... | F16H 59/0213 |
| FR | 3045562 A1 | 6/2017 | | |
| WO | WO-2019084505 A1 * | 5/2019 | ............... | G01B 7/30 |

OTHER PUBLICATIONS

Abstract for FR3045562 (A1), Published: Jun. 23, 2017, 1 page.
European Search Report for Application No. 21306248.2, mailed Feb. 23, 2022, 8 pages.

* cited by examiner

*Primary Examiner* — Gregory Robert Weber
(74) *Attorney, Agent, or Firm* — CANTOR COLBURN LLP

(57) ABSTRACT

A control lever assembly for controlling an aircraft system. The lever includes: a housing having an outer side and an aperture defined by a rim; and a control lever extending through the aperture and movable in the aperture; the control lever having an outer cover member arranged to slide over the outer side of the housing and cover the rim throughout the range of movement of the control lever.

16 Claims, 3 Drawing Sheets

CONTROL LEVER ASSEMBLY FOR CONTROLLING AN AIRCRAFT SYSTEM

CROSS-REFERENCE TO RELATED APPLICATIONS

This application claims priority to European Patent Application No. 21306248.2 filed Sep. 13, 2021, the entire contents of which is incorporated herein by reference.

TECHNICAL FIELD

The following description relates to a control lever assembly for controlling an aircraft system.

BACKGROUND

Aircraft control columns are used to control an aircraft. Such control columns act as control levers for controlling aircraft systems. One such control lever is a side stick. Side sticks are connected to control surfaces of the aircraft. Such connections may be mechanical or electrical. Closing bellows are employed to seal between the moveable control lever and a housing. As such, ingress of detritus and dirt is restricted.

The control lever, also known as a control stick, is moved to control the aircraft. The bellows are mounted to the control lever and housing, and extend therebetween. A handle portion of the control lever protrudes from the bellows. The bellows flex to allow movement of the control lever.

SUMMARY OF THE INVENTION

According to an aspect, there is provided a control lever assembly for controlling an aircraft system, comprising a housing having an outer side and an aperture defined by a rim, and a control lever extending through the aperture and movable in the aperture, the control lever having an outer cover member arranged to slide over the outer side of the housing and cover the rim throughout the range of movement of the control lever.

The outer cover member may be an outer flange. The outer cover member may comprise a skirt. The skirt may extend circumferentially.

The rim may overlap the periphery of the outer cover member throughout the range of movement of the control lever.

The rim may be free from exposure throughout the range of movement of the control lever.

The housing may have an inner side. The aperture may extend between the inner side and the outer side of the housing.

The control lever may comprise an inner cover member. The inner cover member may be an inner flange. The inner cover member may comprise an inner skirt. The inner skirt may extend circumferentially.

The inner cover member may be arranged to slide over the inner side of the housing.

The inner cover member may cover the rim throughout the range of movement of the control lever.

The rim of the aperture may overlap the outer cover member and the inner cover member throughout the range of movement of the control lever.

A spacing may be defined between the inner cover member and the outer cover member. The spacing may be greater than the thickness of the housing received between the inner cover member and the outer cover member.

The inner cover member, the outer cover member and the housing may define a chicane configuration. A first chicane path may extend between the outer cover member and the housing. A second, return chicane path may extend between the inner cover member and the housing.

The outer side of the housing may comprise an arced surface. The arced surface may be an outer arced surface. The arced surface may comprise a partial domed portion.

The outer cover member may comprise a sealing surface. The sealing surface may be arced. The sealing surface may comprise a partial domed portion.

The sealing surface may overlap the arced surface of the housing. A minimum overlap of the sealing surface and the arced surface may be at least 3 mm.

The sealing surface may be parallel with the arced surface.

The sealing surface may be parallel curved with the arced surface.

The sealing surface may be spaced from the arced surface. The sealing surface may be free from contact with the arced surface.

The outer cover member may be free from contact with arced surface.

The sealing surface may be spaced from the arced surface by a gap having a substantially constant width throughout the range of movement of the control lever.

The gap may have a maximum width of 1 mm.

The gap may be between 0.5 mm and 1 mm.

The outer cover member may be rigid.

The control lever may be pivotable. The control lever may be pivotable within the aperture.

The control lever may comprise a control shaft. The outer cover member may extend from the control shaft. The inner cover member may extend from the control shaft.

The control lever may comprise a base portion and a handle portion. The base portion and the handle portion may define the control shaft. The handle portion may upstand from the housing. The base portion may extend in the housing. The base portion may extend through the aperture. The handle portion may be mounted on the base portion. The handle portion may extend from the base portion.

The handle portion may extend over at least part of the base portion. The handle portion and housing may cover the base portion.

The handle portion may comprise the outer cover member. The outer cover member may be integrally formed with the handle portion. The outer cover member may be a one piece component with the handle portion. The outer cover member may be towards a proximal end of the handle portion.

The base portion may comprise the inner cover member. The inner cover member may be integrally formed with the base portion. The inner cover member may be a one piece component with the base portion. The inner cover member may be towards a distal end of the base portion.

The spacing between the inner cover member and the outer cover member may be constant.

A mount may mount the handle portion and the base portion. The mount may set the spacing between the inner cover member and the outer cover member.

The arced surface may be a first arced surface. The inner side of the housing may comprise a second arced surface. The second arced surface may be an inner arced surface.

The second arced surface may comprise a partial domed portion.

The inner cover member may comprise a sealing surface. The sealing surface may be an arced surface. The sealing surface may comprise a partial domed portion. The sealing surface of the outer cover member may be a first sealing surface and the sealing surface of the inner cover member may be a second sealing surface.

The second sealing surface may overlap the second arced surface of the housing. A minimum overlap of the second sealing surface and the second arced surface may be at least 3 mm.

The second sealing surface may be parallel with the second arced surface.

The second sealing surface may be parallel curved with the second arced surface.

The second sealing surface may be spaced from the second arced surface. The second sealing surface may be free from contact with the second arced surface.

The inner cover member may be free from contact with second arced surface.

The second sealing surface may be spaced from the second arced surface by a gap having a maximum width of 1 mm.

The gap may be between 0.5 mm and 1 mm.

The inner cover member may be rigid.

The inner cover member may be on the base portion.

The rim of the aperture may be sandwiched between the upper and lower cover members throughout the range of movement of the control lever.

The control lever assembly may be a multi-axis control lever assembly. The control lever assembly may be a multidirectional control stick. The control lever assembly may be a side stick assembly. The control lever may be a side stick. The control lever assembly may be a single-axis control lever assembly.

According to an aspect, there is provided a control lever for controlling an aircraft system, comprising a control member with a proximal, pivoting, end and a distal, free end, a proximal cover member having a first sealing surface, and a distal cover member having a second sealing surface facing the first sealing surface, the first and second sealing surfaces being spaced by a gap having a constant thickness between the first and second sealing surfaces to movably receive a rim of an aperture of a housing in the gap.

According to an aspect there is provided a control lever assembly for controlling an aircraft system, comprising: a housing having an outer side and an aperture; and a control lever extending through the aperture and movable in the aperture.

According to an aspect, there is provided a control lever assembly for controlling an aircraft system comprising a housing with an aperture defined by a rim, a control lever extending through the aperture and movable in the aperture, the control lever comprising an upper cover and a lower cover wherein the rim of the aperture is sandwiched between the upper and lower covers throughout the range of movement of the control lever.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION

Figure 1:
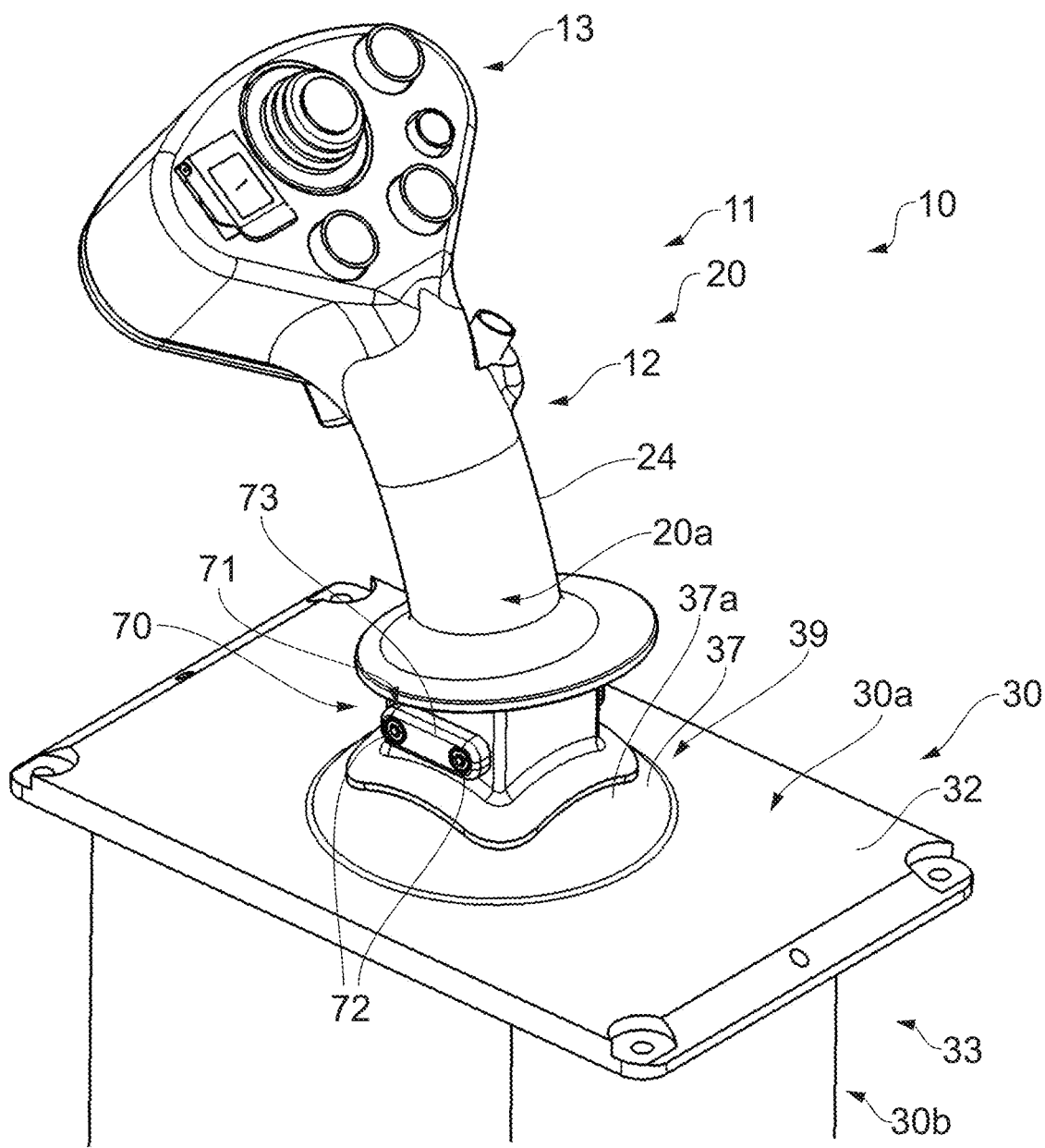
FIG. 1 is a perspective view of a control lever assembly.

With reference to the Figures, a control lever assembly 10 is described below. The control lever assembly 10 is shown in FIG. 1 including a control lever arrangement 11 and a housing 30. The control lever assembly 10 as shown is a side stick assembly for an aircraft system, however use of the arrangements described herein is envisaged with other control levers.

The lever arrangement 11 has a control lever 20. The control lever 20 extends from the housing 30. The control lever 20 is moveable. Movement of the control lever 20 may correspond to movement of a control system of an aircraft (not shown), for example a control surface. Actuation of the control system of an aircraft may be, for example, mechanical or electrical.

The control lever 20 protrudes from the housing 30. The control lever 20 is movable relative to the housing. The control lever 20 defines a handle 12. The handle 12 is grippable by a user to operate the control lever 20. Buttons 13 are mounted on the handle and are actuatable by the user.

The control lever 20 comprises a control shaft 20a. The control shaft 20a comprises a handle portion 24 and a base portion 21 (refer to FIG. 2). The handle portion 24 defines the handle 12. The handle portion 24 upstands from the housing. The base portion 21 (refer to FIG. 2) extends from the handle portion 24 and into the housing 30. In embodiments, a part of the handle portion 24 extends in the housing. The base portion 21 is isolated within the housing 30. The base portion 21 is contained within the housing 30. The base portion 21 is not exposed.

The control lever 20 has a proximal end 23 and a distal end 22. The term 'proximal' is used herein to refer to the end of the control lever 20 received in the housing which is moveable mounted to a base. The term 'distal' is used herein to refer to a free end of the control lever 20. Use of the terms 'distal' and 'proximal' may refer to relative positions of two of more components between the two ends.

Figure 2:
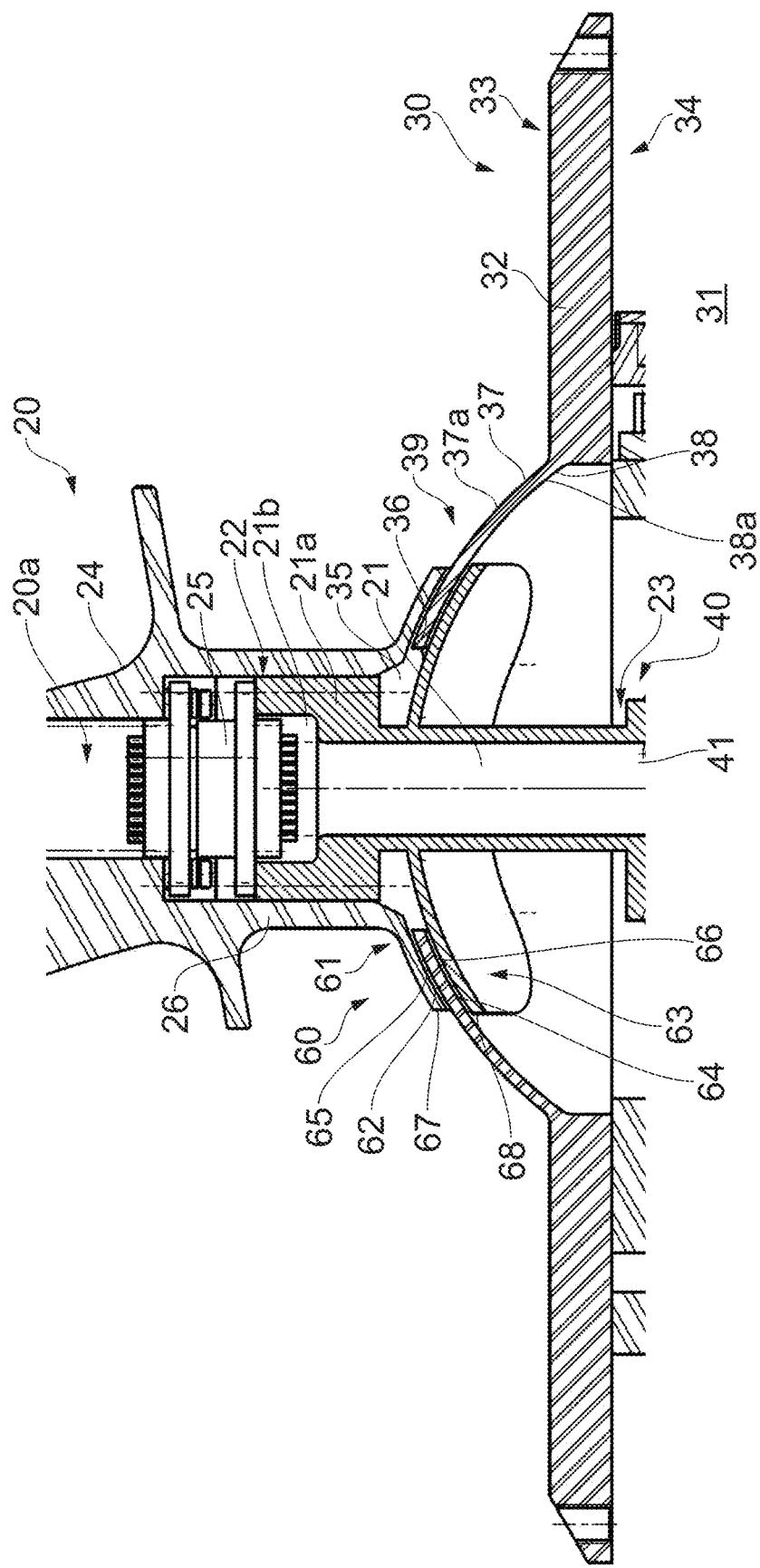
FIG. 2 is a cross sectional schematic side view of part of the control lever assembly of FIG. 1 in a first, neutral, position.

The housing 30 comprises an outer side 33 and an inner side 34 (refer to FIG. 2). In embodiments, the housing includes a cover plate 30a. The housing may include two or more components. The components may include a base section 30b and the cover plate 30a. The housing has a wall 32. The wall 32 of the housing 30 has an outer surface 37 at the outer side 33. The outer surface 37 defines an arced surface 37a. The arced surface 37a is formed by a portion of the wall 32 of the housing 30. The portion of the wall defined by the arced surface 37a defines at least a domed portion 39. The control lever 20 extends from the domed portion 39.

The control lever 20 is pivotable about the proximal end. The control lever arrangement 11 comprises a pivot mechanism 40. The pivot mechanism 40 enables the control shaft 20a to pivot upon application of force by the user. The base portion 21 is coupled to the pivot 41. The control lever is a multi-axis control lever. The control lever is a multi-directional control lever. The control lever can pivot more than one direction and at more than one angle. The user can apply force to pivot the control lever at any angle or in any direction within the range of movement of the control lever.

The housing 30 defines a chamber 31. The pivot mechanism 40 is within the chamber 31. In embodiments, the pivot assembly 40 may be disposed external to the housing 30.

The base portion 21 extends in the chamber 31. The base portion 21 is movable within the housing 30. In embodiments, at least a part of the handle portion 24 extends in the chamber 31.

The housing 30 has an aperture 35. The aperture 35 is defined by a rim 36. The edge of the aperture forms the rim 36. The aperture 35 extends through the housing wall 32 from the outer side 33 to the inner side 34. The base portion 21 extends through the aperture 35. The base portion 21 protrudes from the housing 30. A protruding portion 21a acts as a mount 21b for the handle portion 24. The base portion 21 is movable within the aperture 35. In embodiments, the handle portion 24 extends in the aperture 35.

The wall 32 of the housing 30 has an inner surface 38 at the inner side 34. The inner surface 38 defines a second arced surface 38a, the first arced surface being the arced surface 37a. The second arced surface 38a is formed by a portion of the wall 32 of the housing 30. The second arced surface 38a opposes the first arced surface to define the domed portion 39.

The domed portion 39 of the wall 32 has a thickness that is less than a thickness of the wall 32. The thickness of the domed portion 39 is constant. The first arced surface 37a and the second arced surface 38a are parallel. The first arced surface 37a and the second arced surface 38a are parallel curved. The aperture 35 extends between the first arced surface 37a and the second arced surface 38a.

The housing 30 is formed from of plastic. In embodiments the housing 30 is formed from of metal sheet. In other embodiments the housing is made of any other suitable material.

A sealing arrangement 60 is formed between the housing 30 and the control lever 20. The handle portion 24 comprises a handle body 26. An outer flange 61 extends from the handle body 26. The outer flange 61 acts as an outer cover member. The outer flange 61 is arranged to slide relative to the outer side 33 of the housing 30. The outer flange 61 is a rigid flange. The outer flange 61 has a lip 67. The lip 67 defines a periphery of the outer flange 61. The outer flange 61 defines a skirt. The outer flange 61 forms a cover. The outer flange 61 is configured to cover the aperture 35. The outer flange 61 is integrally formed with the handle portion 24. The outer flange 61 and handle portion 24 are a one-piece component. The outer flange 61 is configured to cover the rim 36. In embodiments the outer flange 61 is integral with the control lever 20. In embodiments, the outer flange 61 is integral with the base portion 21.

The outer flange 61 comprises an outer sealing surface 62 that overlaps the outer surface 37 of the housing 30. The edge of the outer sealing surface 62 is defined by the lip 67 of the outer flange 61. The outer sealing surface 62 of the outer flange 61 is parallel with the outer surface 37 of the housing 30. The outer sealing surface 62 defines an arced surface. The outer sealing surface 62 is parallel curved with the arced surface 37a.

The outer flange 61 is configured to cover the aperture 35 throughout the range of movement of the control lever 20. The outer flange 61 is configured to cover the rim 36 throughout the range of movement of the control lever 20. The outer sealing surface 62 overlaps the outer surface 37 by 3 mm. The overlap in embodiments is between 3 mm and 4 mm.

The term 'sealing' as used herein refers to the function and/or one or more features that act to restrict ingress past the feature. As used herein, the term 'cover' refers to the function and/or one or more features that extend over one or more features such that access to the one or more features is prevented or restricted.

The outer flange 61 is free from contact with the outer surface 37. The outer sealing surface 62 is free from contact with the outer surface 37. The outer sealing surface 62 is spaced from the outer surface 37. The outer sealing surface 62 is spaced from the outer surface 37 by a gap 65. The width of the gap 65 is constant over the range of the overlap between the outer sealing surface 62 and the outer surface 37. A width of the gap 65 may be at least substantially constant throughout the range of movement of the control lever. The width of the gap is 1 mm. The width of the gap 65 in embodiments is between 0.5 mm and 1 mm.

The outer flange 61 is formed from a polymer, such as polyether ether ketone (PEEK). In embodiments the outer flange is constructed using other suitable materials.

The materials used in the sealing arrangement can be durable materials and the wear is minimised because there is no contact between the sealing surfaces. The sealing arrangement described does not interfere between moving parts. The friction and hysteresis of the described sealing arrangement do not vary depending on the deflection movement of the control lever.

The base portion 21 comprises a base body and an inner flange 63. The inner flange 63 extends from the base body. The inner flange 63 acts as an inner cover member. The inner flange 63 is arranged to slide relative to the inner side 34 of the housing 30. The inner flange 63 has a second lip 68. The lip defines a periphery of the inner flange 63. The inner flange 63 defines a skirt. The inner flange 63 forms a cover. The inner flange 63 is configured to cover the aperture 35. The inner flange 63 is configured to cover the rim 36. In embodiments the inner flange 63 is integral with the control lever 20. In embodiments the inner flange 63 is integral with the handle portion 24.

The inner flange 63 comprises an inner sealing surface 64 that overlaps the inner surface 38 of the housing 30. The edge of the inner sealing surface 64 is defined by the lip 68 of the inner flange 63. The inner sealing surface 64 is parallel with the inner surface 38. The inner sealing surface 64 is arcuate. The inner sealing surface 64 is parallel curved with the second arced surface 38a.

The inner flange 63 is configured to cover the aperture 35 throughout the range of movement of the control lever 20. The inner flange 63 is configured to cover the rim 36 throughout the range of movement of the control lever 20. The inner sealing surface 64 overlaps the inner surface 38 by 3 mm. In embodiments, the overlap is between 3 mm and 4 mm. In embodiments, the inner flange 63 may act to seal when the control lever 20 is in a neutral, un-deflected position. In some such embodiments part of the inner flange 63 is offset from the rim 36 when the control lever 20 is in a deflected position. Accordingly, the space within the housing may be minimized.

The inner flange 63 is free from contact with the inner surface 38. The inner sealing surface 64 is free from contact with the outer surface 38. The inner sealing surface 64 is spaced from the inner surface 38. The inner sealing surface 64 is spaced from the inner surface 38 by a second gap 66, wherein the first gap is the gap 65 between the outer sealing surface 62 and the outer surface 37. The width of the second gap 66 is constant over the range of the overlap between the inner sealing surface 64 and the inner surface 38. The width of the second gap 66 is constant over the entire range of motion of the control lever 20. The width of the second gap 66 is 1 mm. In embodiments, the width of the gap is between 0.5 mm and 1 mm.

The inner flange is formed from aluminum. In embodiments, the inner flange is made of plastic. In other embodiments, the inner flange is constructed using any other suitable material. In embodiments, the inner flange 63 may be omitted. In such an embodiment the sealing arrangement 60 may be formed solely between the outer flange 61 and the housing 30.

The outer and inner flanges 61, 63 have corresponding profiles. The outer and inner sealing surfaces 62, 64 have corresponding profiles. The aperture 35 has a substantially corresponding profile as the outer and inner flanges 61, 63. In embodiments, the aperture does not have a substantially corresponding profile as the outer and inner flanges 61, 63.

The outer and inner flanges 61, 63 overlap the housing 30 by substantially the same radial extent. The lips 67, 68 of the outer and inner flanges 61, 63 are aligned. The outer and inner sealing surfaces 62, 64 overlap the outer and inner surfaces 37, 38 of the housing respectively by substantially the same radial extent. In embodiments, the extent of the inner flange 63 overlapping with the housing 30 may be smaller than the extent of the outer flange 61 overlapping with the housing 30 when control lever 20 is in the neutral position corresponding to FIG. 2.

The outer flange 61 and the inner flange 63 are parallel. The outer flange and the inner flange 61, 63 are parallel curved. The outer sealing surface 62, the inner sealing surface 64, the outer surface 37 and the inner surface 38 are all parallel curved. The term parallel curved refers to the spacing between two curves being constant throughout the range of the curve.

Throughout the range of movement of the control lever 20, the rim 36 of the aperture 35 is received between the outer and inner flanges 61, 63. The rim 36 is sandwiched between the outer and inner flanges 61, 63.

The outer flange 61, inner flange 63 and the housing 30 define a chicane configuration. The chicane configuration provides an elongated ingress path for detritus. Detritus includes foreign objects. Said elongated ingress route is not linear. The elongated ingress path is provided as a non-linear path.

The base portion 21 of the control shaft 20a has a first, distal, end 22 and a second, proximal, end 23. The base portion 21 extends from the handle portion 24. The base portion is attached to the handle portion at a distal end 22. The base portion 21 is attached to a pivot assembly 40 at the proximal end 23. The mount 21b is at the distal end of the base portion 21. The inner flange 63 is towards the distal end 22. The inner flange 63 is between the proximal end 23 and the mount 21b.

A connector 25 couples the base portion 21 with the mount 21b at the first end 23 of the base portion 21. A securing arrangement 70 (refer to FIG. 1) secures the handle portion 24 on the base portion 21. Once coupled, the base portion 21 and the handle 24 are able to move and pivot as a fixed structure.

The handle portion 24 is formed from plastic. In other embodiments, the handle 24 can be formed from any other suitable material.

The handle portion 24 comprises the outer flange 61. The handle portion 24 and the outer flange 61 are integrally formed. The handle portion 24 and the outer flange 61 are a one piece component. In embodiments the outer flange 61 may be removable from the handle portion 24.

Referring to FIG. 1, the securing arrangement 70 comprises at least one fastening assembly 71. A fastening assembly 71 is arranged on either side of the control lever 20. The fastening assembly 71 has two fasteners 72. The fastening arrangement has a joining apparatus 73. The joining apparatus 73 is configured to receive the fasteners 72. The fasteners 72 are configured to fasten the joining apparatus 73, the handle portion 24 and the base portion 21 together. It can be appreciated that the securing arrangement 70 described is one of many potential embodiments of a securing arrangement. Any arrangement that secures the handle portion 24 and the base portion 21 to one another to form an integral component may be used. In embodiments the width of the first gap 65 may be set by the location of the coupling of the handle portion 24 and the base portion 21.

Referring to FIG. 2, the base portion 21 comprises the inner flange 63. The base portion 21 and the inner flange 63 are integrally formed. The base portion 21 and the inner flange 63 are a one piece component.

The parts of the control lever 20 can be separated. The handle portion 24 may be de-coupled from the base portion 21. The de-coupling of the handle 24 from the base portion 21 can be achieved without de-coupling the base portion 21 from the pivot mechanism 40. The base portion 21 therefore remains in the housing upon removal of the handle portion 24. The inner flange 63 remains covering the rim 36 of the aperture 35. This is advantageous because the handle can be removed for maintenance, but the pivot mechanism and other components equipment remain protected by at least the inner flange 63. This helps prevent detritus from entering the housing 30 during maintenance. This helps maximize the working life of the control lever.

The control lever 20 is a multi-axis control lever. The control lever 20 is a multidirectional control stick. The control lever 20 is a side stick. The initial, neutral, position of the control lever 20 is equidistant from the circumference of the rim 36. The control lever 20 extends through the center of the aperture 35. A force is applied by a user to the control lever 20 to move the control lever 20. A force is applied to the control lever 20 to pivot the control lever 20. When a force is applied to the control lever 20 in a first direction, the control lever 20 pivots in the first direction.

In FIG. 2, the control lever 20 is in a neutral, un-deflected, position. The outer flange 61 and the inner flange 63 overlap the rim 36 of the aperture 35. The rim 36 of the aperture 35 is received between the outer flange 61 and the inner flange 63. The outer and inner flange 61, 63 overlap the outer and inner surfaces 37, 38 of the housing 30 by substantially equal distances on either side of the control lever 20.

Figure 3:
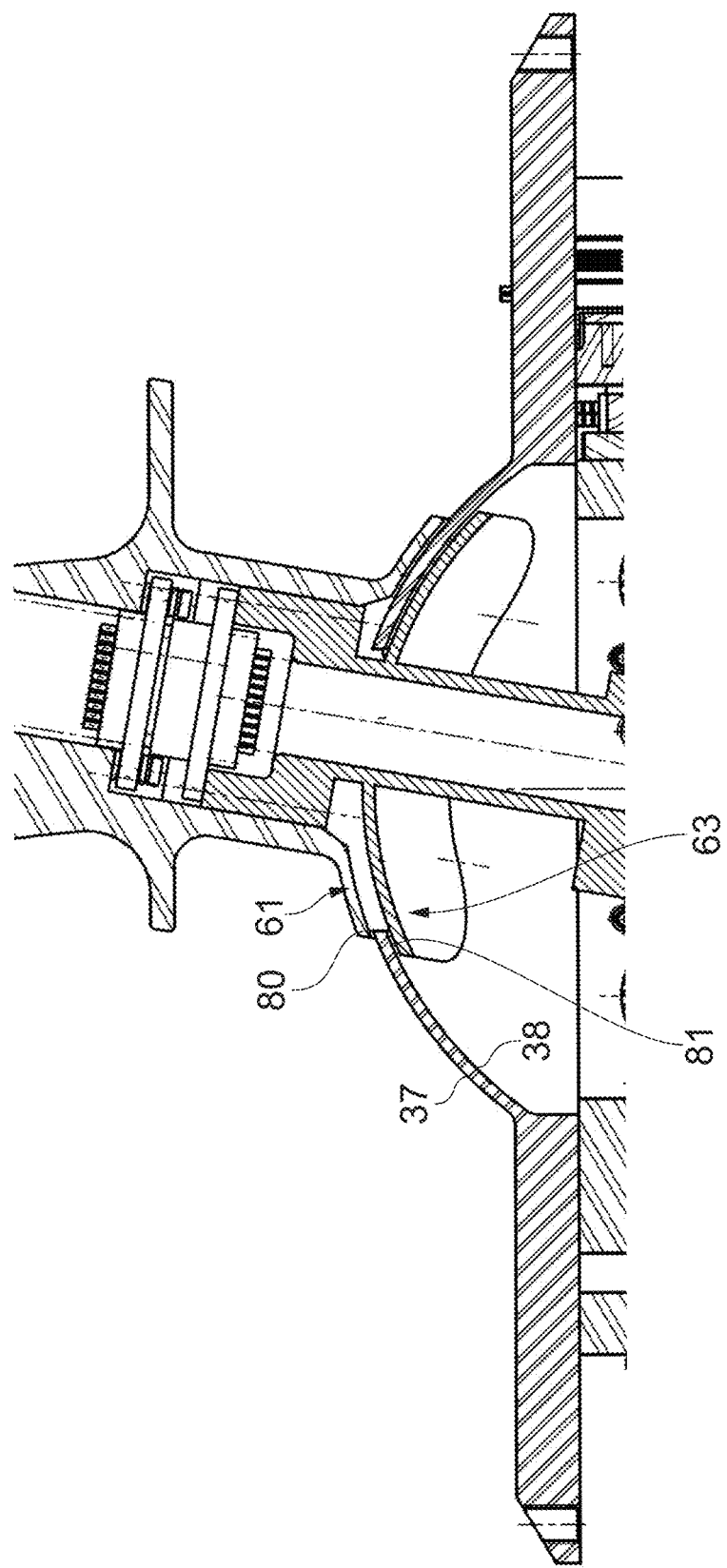
FIG. 3 is a cross sectional schematic side view of part of the control lever assembly in a second, deflected, position.

With reference to FIG. 3, the control lever 20 is moved into a deflected position. The control lever 20 is deflected upon application of a force by a user. The control lever 20 is shown at maximum deflection in FIG. 3. The control lever 20 has been deflected in the first direction. The first direction is towards the right hand side of FIG. 3. Similarly to FIG. 2, the outer flange 61 and the inner flange 63 overlap the rim 36 of the aperture 35. The rim 36 of the aperture 35 is received between the outer flange 61 and the inner flange 63. The rim 36 is sandwiched between the outer and inner flanges 61, 63. The rim 36 is covered by the outer and inner flanges 61, 63. In contrast to FIG. 2, the outer and inner flanges 61, 63 overlap the outer and inner surfaces 37, 38 of the housing 30 by different distances on either side of the control lever 20. The overlapping distance in the first direction (the right hand side) is greater in FIG. 3 in comparison to the overlap in the first direction shown in FIG. 2. The overlapping distance in the direction the control lever 20 has been deflected, is greater in FIG. 3 in comparison to the overlap in the first direction shown in FIG. 2. The overlapping distance in a second direction, opposite the first direction (the left hand side), is less in FIG. 3 in comparison to the overlapping distance in the second direction in FIG. 2. The overlapping distance in the direction the control lever 20 has been deflected away from is less in FIG. 3 in comparison to the overlapping distance in the second direction in FIG. 2.

The outer flange 61 overlaps the housing 30. The outer flange 61 overlaps the outer surface 37. There is a minimum overlapping distance 80. The minimum overlapping distance 80 in the present embodiment is 3 mm. The minimum overlapping distance 80 may be 3 mm to 4 mm. The inner flange 63 overlaps the housing 30. The inner flange 63 overlaps the inner surface 38. There is a second minimum overlapping distance 81, wherein the minimum overlapping distance is a first minimum overlapping distance 80. The second minimum overlapping distance 81 is 3 mm. The second minimum overlapping distance 81 is 3 mm to 4 mm. The first and second minimum overlapping distances 80, 81 are equal. In embodiments, the first and second minimum overlapping distances 80, 81 differ.

The force required to move the control lever 20 is applied to the handle portion 24. In embodiments wherein the base portion 21 extends from the housing 30, a force to the base portion 21 to move the control lever 20.

In embodiments the control stick may not be multidirectional. The control lever may be a single-axis control lever, for example a throttle control lever in an aircraft.

An advantage of the sealing arrangements described herein are that the ingress path into the housing for detritus is increased by the overlapping sealing surface. The entry of detritus may be reduced to maximize the reliability of the device. By providing a contact free sealing arrangement, friction caused by movement of the control lever is minimized or removed. The flanges slide over the housing.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the scope of the claims. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

The invention claimed is:

1. A control lever assembly for controlling an aircraft system, comprising:
   a housing having an outer side and an aperture defined by a rim; and
   a control lever extending through the aperture and movable in the aperture;
   the control lever having an outer cover member arranged to slide over the outer side of the housing and cover the rim throughout the range of movement of the control lever;
   wherein the outer cover member comprises a sealing surface and is free from contact with the outer side.

2. The control lever assembly of claim 1, wherein the housing has an inner side, and the control lever comprises an inner cover member arranged to slide over the inner side of the housing and cover the rim throughout the range of movement of the control lever.

3. The control lever assembly of claim 2, wherein the outer cover member and the inner cover member overlap the rim of the aperture throughout the range of movement of the control lever.

4. The control lever assembly of claim 2, wherein the spacing between the inner and outer cover members is greater than a thickness of the housing received between the inner and outer cover members.

5. The control lever assembly of claim 2, wherein the outer cover member, inner cover member and the housing define a chicane configuration.

6. The control lever assembly of claim 1, wherein the outer side of the housing defines an arced surface.

7. The control lever assembly of claim 6, wherein the arced surface defines at least a partial domed portion.

8. The control lever assembly of claim 6, wherein the sealing surface overlaps the arced surface of the housing.

9. The control lever assembly of claim 8, wherein the sealing surface extends parallel with the arced surface.

10. The control lever assembly of claim 6, wherein the outer cover member is spaced from the arced surface by a gap having a substantially constant width throughout the range of movement of the control lever.

11. The control lever assembly of claim 10, wherein the gap has a maximum width of 1 mm.

12. The control lever assembly of claim 10, wherein the width of the gap between the outer cover member and the arced surface is between 0.5 mm and 1 mm.

13. The control lever assembly of claim 1, wherein the control lever comprises a base portion and a handle portion and the handle portion comprises the outer cover member.

14. The control lever assembly of claim 1, wherein the control lever is a multi-axis control lever.

15. The control lever assembly of claim 1, wherein the control lever is a single-axis control lever.

16. A control lever assembly for controlling an aircraft system comprising:
   a housing with an aperture defined by a rim and an outer side;
   a control lever extending through the aperture and movable in the aperture,
   the control lever comprising an upper cover and a lower cover, wherein the rim of the aperture is sandwiched between the upper and lower covers throughout the range of movement of the control lever,
   wherein the upper cover comprises a sealing surface and is free from contact with the outer side.

* * * * *